(12) United States Patent
Matsuzaki

(10) Patent No.: US 8,861,052 B2
(45) Date of Patent: Oct. 14, 2014

(54) IMAGE PROCESSING APPARATUS, IMAGE PROCESSING METHOD, AND COMPUTER-READABLE MEDIUM

(75) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 13/307,246

(22) Filed: Nov. 30, 2011

(65) Prior Publication Data

US 2012/0147394 A1 Jun. 14, 2012

(30) Foreign Application Priority Data

Dec. 8, 2010 (JP) ................................. 2010-273942
Nov. 11, 2011 (JP) ................................. 2011-247969

(51) Int. Cl.
*G03F 3/08* (2006.01)
*H04N 1/60* (2006.01)
*G06K 9/00* (2006.01)
*G03G 15/01* (2006.01)
*G03G 15/00* (2006.01)

(52) U.S. Cl.
CPC .......... G03G 15/556 (2013.01); G03G 15/0121 (2013.01); H04N 1/6025 (2013.01)
USPC ............ 358/518; 358/1.9; 358/520; 382/167; 382/162

(58) Field of Classification Search
None
See application file for complete search history.

(56) References Cited

U.S. PATENT DOCUMENTS

| | | | | |
|---|---|---|---|---|
| 6,950,557 B2* | 9/2005 | Kimura | .......................... | 382/239 |
| 7,009,734 B2* | 3/2006 | Suwa et al. | .................... | 358/1.9 |
| 8,228,557 B2* | 7/2012 | Iinuma | ........................... | 358/1.9 |
| 8,456,681 B2* | 6/2013 | Suzuki | ......................... | 358/1.15 |
| 2004/0109178 A1* | 6/2004 | Couwenhoven et al. | ...... | 358/1.9 |
| 2004/0223173 A1* | 11/2004 | Arai | ............................... | 358/1.9 |
| 2005/0046882 A1* | 3/2005 | Kobayashi | ...................... | 358/1.9 |
| 2005/0083371 A1* | 4/2005 | DeBaer | ........................... | 347/43 |
| 2006/0197998 A1* | 9/2006 | Shibuya et al. | ............... | 358/518 |
| 2006/0245016 A1* | 11/2006 | Fukao et al. | ................... | 358/518 |
| 2007/0292156 A1 | 12/2007 | Eguchi | | |
| 2009/0040207 A1* | 2/2009 | Park et al. | ..................... | 345/211 |
| 2009/0097046 A1* | 4/2009 | Ohta et al. | ..................... | 358/1.9 |
| 2010/0118322 A1* | 5/2010 | Tsutsumi | ...................... | 358/1.9 |
| 2011/0211209 A1* | 9/2011 | Eguchi | ........................... | 358/1.9 |
| 2011/0216381 A1* | 9/2011 | Soeda et al. | .................. | 358/518 |
| 2011/0299143 A1* | 12/2011 | Alessi et al. | ................. | 358/504 |
| 2012/0050766 A1* | 3/2012 | Saiki | .............................. | 358/1.9 |
| 2012/0086987 A1* | 4/2012 | Tamura | ........................ | 358/3.24 |
| 2013/0128291 A1* | 5/2013 | Shibasaki et al. | ............. | 358/1.9 |

FOREIGN PATENT DOCUMENTS

JP 2007-334320 A 12/2007

* cited by examiner

*Primary Examiner* — Madelein A Nguyen
(74) *Attorney, Agent, or Firm* — Fitzpatrick, Cella, Harper & Scinto

(57) ABSTRACT

An apparatus comprises: a first conversion unit configured to convert a first signal value serving as an output signal of each of a plurality of color materials into a value indicating an amount of each of the plurality of color materials; a control unit configured to control the value indicating the amount of each of the plurality of color materials based on a limit value for a total amount of the plurality of color materials for each pixel; and a second conversion unit configured to convert the value indicating the amount of each of the plurality of color materials that is controlled, into a second signal value serving as a corresponding output value, wherein when the total amount of the plurality of color materials based on the first signal value is not larger than the limit value in a pixel of interest, the control unit outputs the first signal value.

12 Claims, 14 Drawing Sheets

| COLOR | DENSITY VALUE | AMOUNT (g) OF TONER ||
|---|---|---|---|
| | | TONER A | TONER B |
| C | 100% | a | b |
| M | 100% | a | c |
| Y | 100% | a | d |
| K | 100% | a | e |

AMOUNTS OF TONERS OF RESPECTIVE COLORS SATISFY RELATION : b>c>e>d

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image processing apparatus and image processing method for controlling the total amount of toner or ink in print processing, and a computer-readable medium storing a program for generating image processing parameters.

2. Description of the Related Art

A color printer which uses a printing material (color material) such as toner or ink often has a limit in the amount of a printing material that can be used for each pixel. For example, an electrophotographic printer which uses cyan/magenta/yellow/black (to be referred to as C, M, Y, and K, respectively, hereinafter) toners will be examined. In this electrophotographic printer, when the maximum value of a toner output of each color for each pixel is 100%, the limit value of the total amount of toner for each pixel is defined as, for example, 300%. If the total amount of toner exceeds 300%, a failure in toner fixing or toner scattering may occur, resulting not only in degradation of the image quality but also in damage to the apparatus main body.

To solve the above-mentioned problem, the total amount of C, M, Y, and K toners is calculated for each pixel, and the total amount is decreased if it exceeds a limit value (see, for example, Japanese Patent Laid-Open No. 2007-334320). Processing of controlling and outputting the total amount of toner will be referred to as "toner total amount control processing" for convenience. In Japanese Patent Laid-Open No. 2007-334320, K toner is increased while decreasing C, M, and Y toners by equal amounts. Accordingly, the total amount of toner can be decreased while minimizing a change in image quality. When limiting the total amount of toner, an LUT (Look Up Table) or the like can be used to convert a density value into information on the amount of consumed toner, implementing accurate toner total amount control processing.

However, the conventional technique of controlling the total amount of toner has a problem in that a signal distorts before and after toner total amount control processing occurs. Although details will be described later, conventional toner total amount control processing is performed after temporarily converting a density value into information on the amount of consumed toner using an LUT or the like. Then, the toner amount information after toner total amount control processing is converted back into a density value using an LUT or the like. At this time, the relationship between the density value and the amount of consumed toner is not always linear. For example, an amount of toner consumed when the density value is 100% may be more than double an amount of toner consumed when the density value is 50%. That is, the relationship between the density value and the amount of consumed toner may become non-linear.

Hence, information is lost in the process of converting a density value into an amount of consumed toner and the process of converting an amount of consumed toner into a density value because compression of a value and the like are done with a non-linear relationship. Since these processes are executed for all pixels, the gradation characteristic of an image and the like degrade due to loss of information, resulting in poor image quality.

SUMMARY OF THE INVENTION

According to one aspect of the present invention, there is provided an image processing apparatus which controls output of each of a plurality of color materials used to print image data, comprising: a first conversion unit configured to convert a first signal value serving as an output signal of each of the plurality of color materials into a value indicating an amount of each of the plurality of color materials; a control unit configured to control the value indicating the amount of each of the plurality of color materials based on a limit value for a total amount of the plurality of color materials for each pixel; and a second conversion unit configured to convert the value indicating the amount of each of the plurality of color materials that is controlled by the control unit, into a second signal value serving as a corresponding output value, wherein in a case where the total amount of the plurality of color materials based on the first signal value is not larger than the limit value in a pixel of interest contained in image data, the control unit outputs the first signal value as the second signal value for the pixel of interest.

According to another aspect of the present invention, there is provided an image processing method in an image processing apparatus which controls output of each of a plurality of color materials used to print image data, comprising: a first conversion step of converting a first signal value serving as an output signal of each of the plurality of color materials into a value indicating an amount of each of the plurality of color materials; a control step of controlling the value indicating the amount of each of the plurality of color materials based on a limit value for a total amount of the plurality of color materials for each pixel; and a second conversion step of converting the value indicating the amount of each of the plurality of color materials that is controlled in the control step, into a second signal value serving as a corresponding output value, wherein in the control step, in a case where the total amount of the plurality of color materials based on the first signal value is not larger than the limit value in a pixel of interest contained in image data, the first signal value is output as the second signal value for the pixel of interest.

According to another aspect of the present invention, there is provided a computer-readable medium storing a program for causing a computer to function as a first conversion unit configured to convert a first signal value serving as an output signal of each of the plurality of color materials into a value indicating an amount of each of the plurality of color materials, a control unit configured to control the value indicating the amount of each of the plurality of color materials based on a limit value for a total amount of the plurality of color materials for each pixel, and a second conversion unit configured to convert the value indicating the amount of each of the plurality of color materials that is controlled by the control unit, into a second signal value serving as a corresponding output value, wherein in a case where the total amount of the plurality of color materials based on the first signal value is not larger than the limit value in a pixel of interest contained in image data, the control unit outputs the first signal value as the second signal value for the pixel of interest.

The present invention can prevent loss of information in pixels not to undergo toner total amount control processing, and suppress deterioration of the image quality such as degradation of the gradation characteristic.

Further features of the present invention will become apparent from the following description of exemplary embodiments (with reference to the attached drawings).

DESCRIPTION OF THE EMBODIMENTS

Embodiments of the present invention will now be described with reference to the accompanying drawings.

First Embodiment

The first embodiment of the present invention will be described. The first embodiment will explain a method of limiting the amount of toner when the amount of toner consumed for the same density value varies in each individual color. In this specification, a lookup table used in value conversion processing will be abbreviated as an LUT. For example, a one-dimensional lookup table will be abbreviated as a 1D-LUT.

Figure 1:
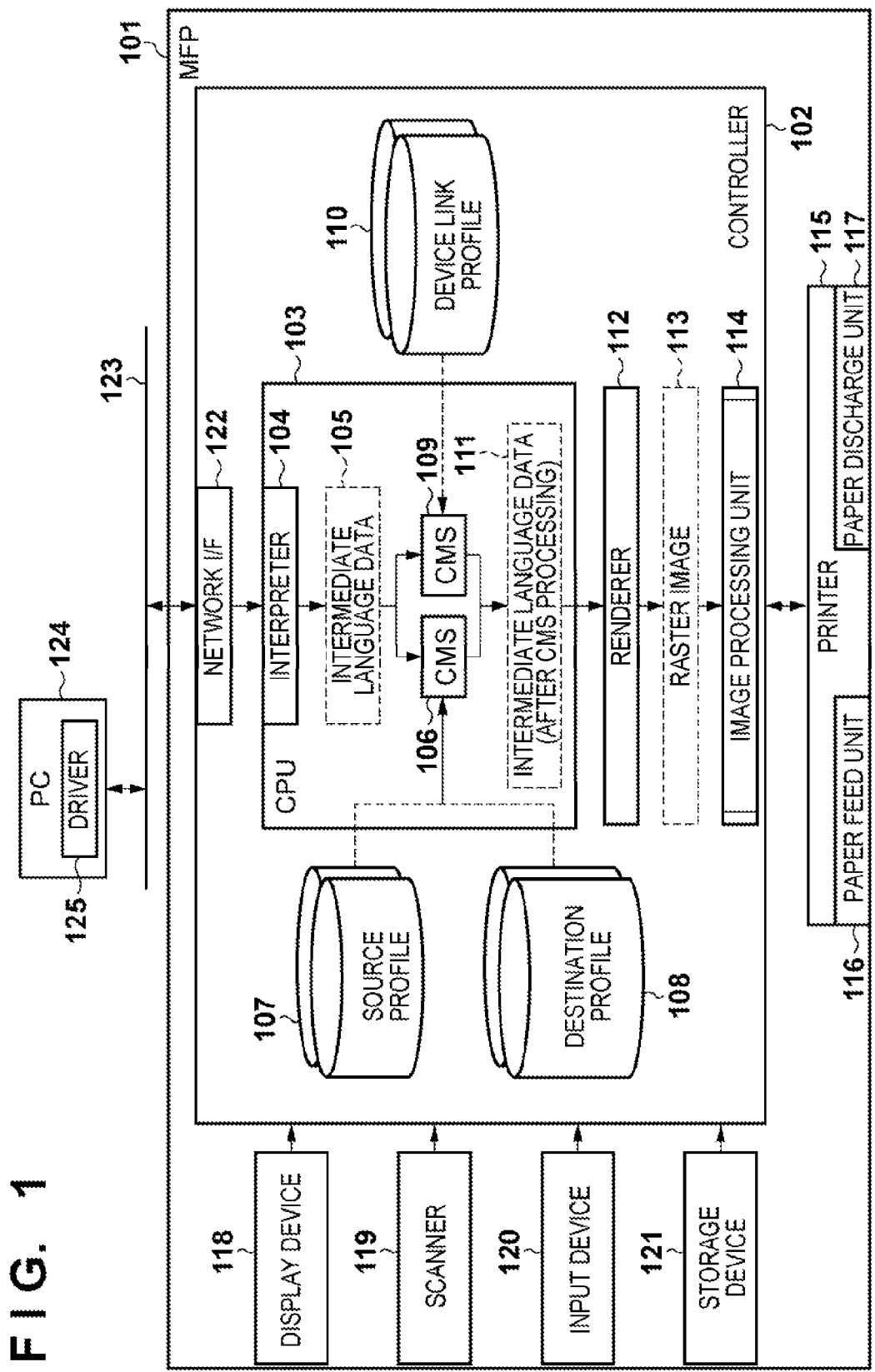
FIG. 1 is a block diagram showing the configuration of a system.

FIG. 1 is a block diagram showing the configuration of a system in the present invention. An MFP (MultiFunction Peripheral) 101 which is an image processing apparatus and uses C, M, Y, and K color toners is connected to another apparatus via a network 123. A PC 124 is connected to the MFP 101 via the network 123. A driver 125 in the PC 124 complies with the MFP 101 and transmits print data to the MFP 101.

The MFP 101 will be described in detail hereinafter. A network I/F 122 receives, for example, print data and transmits, for example, a raster image and control data (both will be described later). A controller 102 includes a CPU 103, renderer 112, and image processing unit 114. An interpreter 104 of the CPU 103 interprets the PDL (Page Description Language) portion of print data received from the PC 124, and generates intermediate language data 105. Each CMS (Color Management System) performs color conversion using color conversion profile information. The MFP 101 in this embodiment includes two CMSs.

A source profile 107 and a destination profile 108 are used by a CMS 106 for performing color conversion to generate intermediate language data (after CMS processing) 111. In this embodiment, a standardized profile such as an ICC profile specified by the ICC (International Color Consortium) is used.

The source profile 107 is a profile used to convert a device-dependent color space such as an RGB or CMYK color space into a device-independent color space such as an L*a*b* or XYZ color space (device-dependent color space-to-device-independent color space). Like the L*a*b* color space, the XYZ color space is a device-independent color space and represents colors using three stimulus values. The destination profile 108 is a profile used to convert a device-independent color space into a CMYK color space that depends on a device (printer 115) (device-independent color space-to-device-dependent color space).

A CMS 109 performs color conversion using a device link profile 110 to generate the intermediate language data (after CMS processing) 111. Note that the device link profile 110 is a profile used to directly convert a device-dependent color space such as an RGB or CMYK color space into a CMYK color space that depends on the device (printer 115).

The CMS 106 or 109 is selected depending on the setting of the driver 125. Although the CMSs are selectively used in accordance with the type of profile in this embodiment, one CMS may process a plurality of types of profiles. Also, the types of profiles are not limited to the example given in this embodiment, and any type of profile may be adopted as long as a CMYK color space that depends on the printer 115 is employed.

The renderer 112 generates a raster image 113 from the generated intermediate language data (after CMS processing) 111. The image processing unit 114 processes the raster image 113 or an image scanned by a scanner 119. The printer 115 connected to the controller 102 forms output data on paper (printing medium) using a plurality of color toners such as C, M, Y, and K toners. The printer 115 includes a paper feed unit 116 which feeds paper, and a paper discharge unit 117 which delivers the paper bearing output data. A display device 118 displays a UI which indicates an instruction to the user and the state of the MFP 101.

The scanner 119 includes an auto document feeder. The scanner 119 irradiates a bundle of document images or a single document image using a light source (not shown), and forms a reflected image of the document on a solid-state image sensor such as a CCD sensor via a lens, obtaining a raster image read signal as image data from the solid-state image sensor. An input device 120 is an interface used to accept an input from the user. A storage device 121 saves, for example, data processed by the controller 102 and data received by the controller 102.

[Image Processing Sequence]

Figure 2:
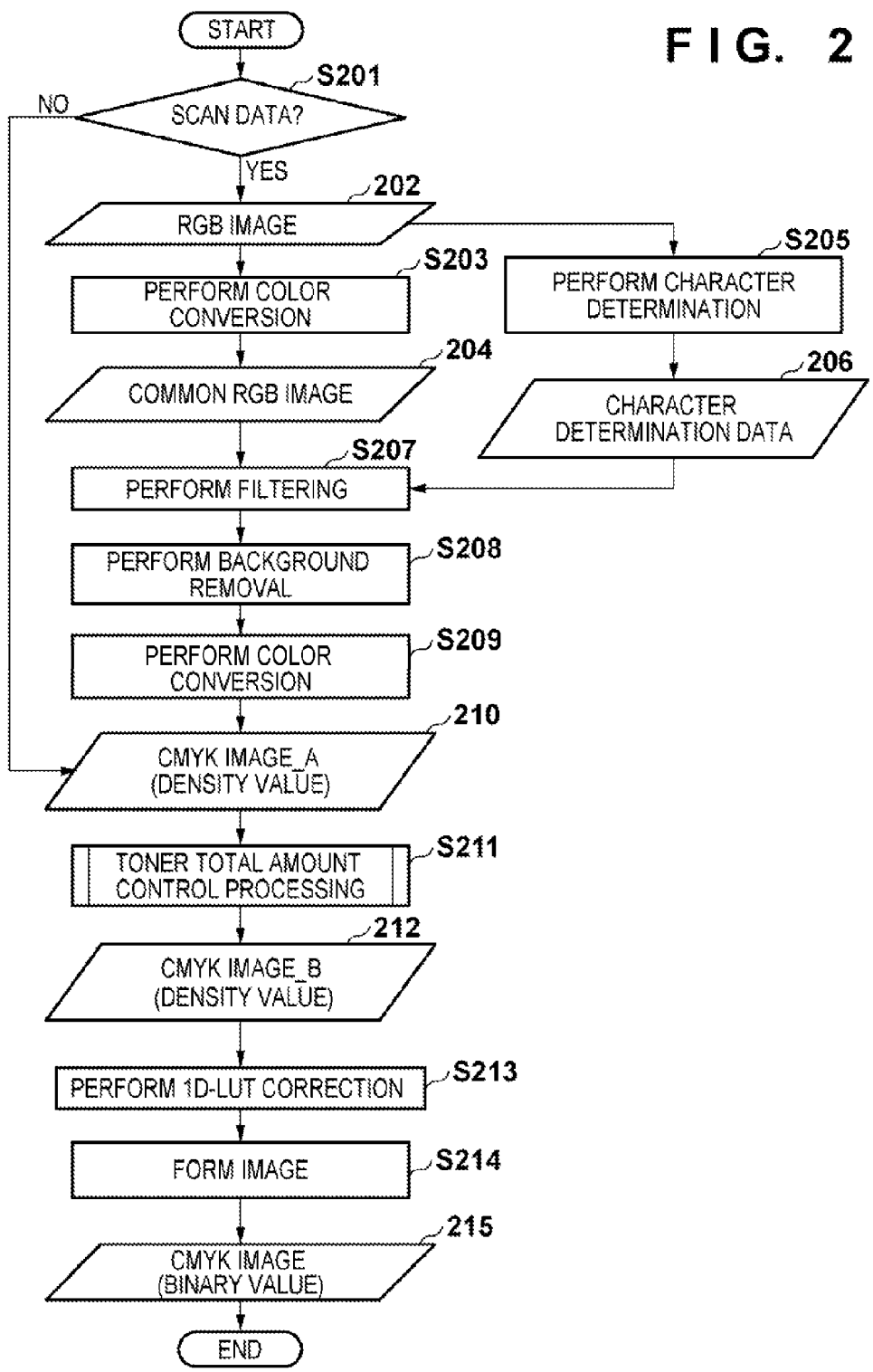
FIG. 2 is a flowchart showing the sequence of image processing.

A sequence in the image processing unit 114 will be described with reference to FIG. 2. In a flowchart described in this specification, a rectangle indicates processing (for example, step S203), a rhombus indicates a conditional branch (for example, step S201), and a parallelogram indicates data (for example, RGB image 202). In this embodiment, the processing sequence is executed by, for example, reading out a program stored in the storage device 121 and executing it by the controller 102 of the MFP 101.

After receiving image data, the image processing unit 114 determines in step S201 whether the received data is scan data received from the scanner 119 or the raster image 113 sent from the driver 125. If the received data is not the scan data (NO in step S201), it is the raster image 113 and represents a CMYK image_A (density value) 210 serving as the first signal value obtained by converting the received image data into a printer device-dependent CMYK color space by the CMS. If the received data is the scan data (YES in step S201), it represents an RGB image 202, so the image processing unit 114 performs color conversion processing to generate a common RGB image 204 in step S203. Note that the common RGB image 204 is defined in a device-dependent RGB color space, and can be converted into a device-independent color space such as an L*a*b* color space by an arithmetic operation. In this case, any device-independent color space is available, including an L*a*b* color space.

In step S205, the image processing unit 114 performs character determination processing for the RGB image 202 to generate character determination data 206. In this case, for example, an image edge is detected to generate the character determination data 206. In step S207, the image processing unit 114 performs filter processing for the common RGB image 204. In this case, different types of filter processing are performed for the character portion and remaining portion of image data using the generated character determination data 206. The image processing unit 114 performs background removal processing to remove the background in the scanned document in step S208. In step S209, the image processing unit 114 performs color conversion processing to generate the CMYK image_A (density value) 210. The "density value" mentioned here is obtained by representing the value of each of C, M, Y, and K densities using a signal value of 0% to 100%. A signal value defined by the number of bits may be used instead of using percent as its unit, as a matter of course. For example, the density value is given by a signal value of 0 to 255 in case of 8 bits. Image formation is done based on the "density value" serving as an output signal for each color.

Figure 6:
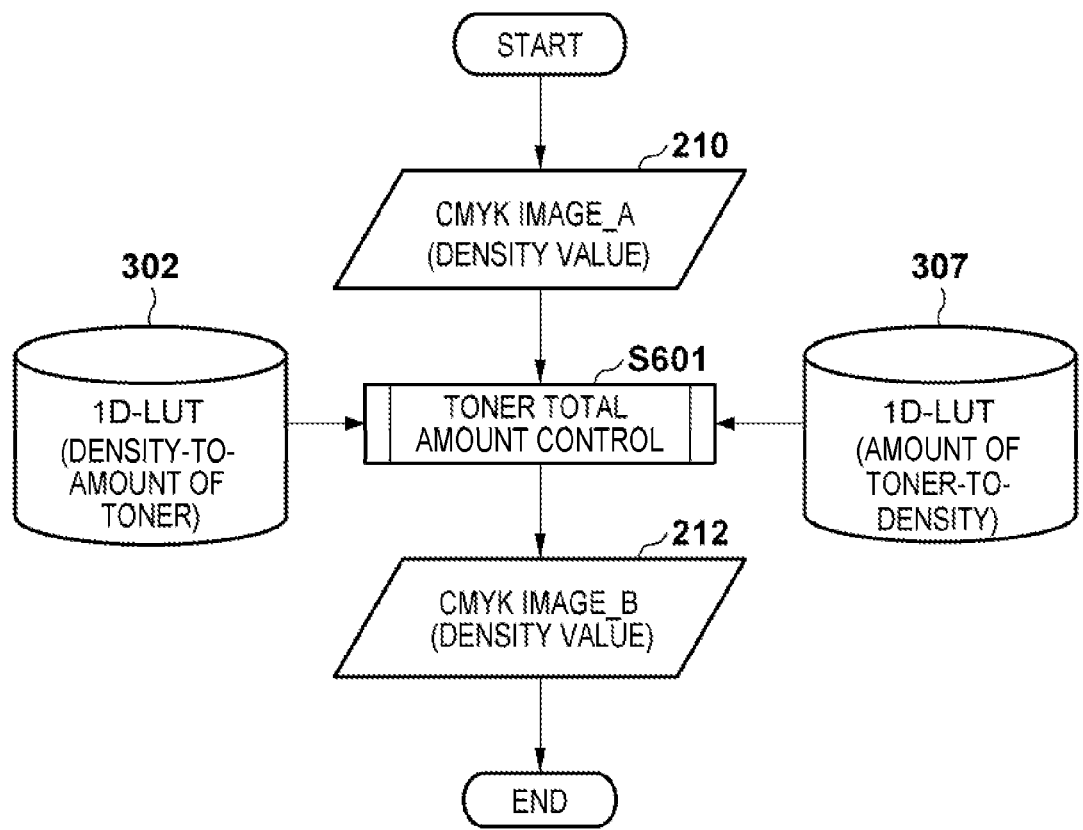
FIG. 6 is a flowchart showing the sequence of toner total amount control processing according to the first embodiment.

In step S211, the image processing unit 114 performs toner total amount control processing for the CMYK image_A (density value) 210 to output a CMYK image_B (density value) 212 serving as the second signal value. This embodiment proposes toner total amount control processing capable of controlling the total amount of toner even if the amount of a color material such as toner consumed for the same density value varies in each individual color. Details of the toner total amount control processing in this processing step according to this embodiment will be described later with reference to FIGS. 6 and 7.

After performing the toner total amount control processing in step S211, the image processing unit 114 corrects the gradation characteristics of the respective C, M, Y, and K colors for the CMYK image_B (density value) 212 using a one-dimensional LUT (1D-LUT) in step S213. The gradation characteristic correction method is not particularly limited and can be a well-known method. Lastly, in step S214, the image processing unit 114 performs image forming processing to generate a CMYK image (binary value) 215, and transmits image data to the printer 115. Accordingly, the image processing sequence ends.

[Toner Total Amount Control Processing (Conventional Method)]

Figure 3:
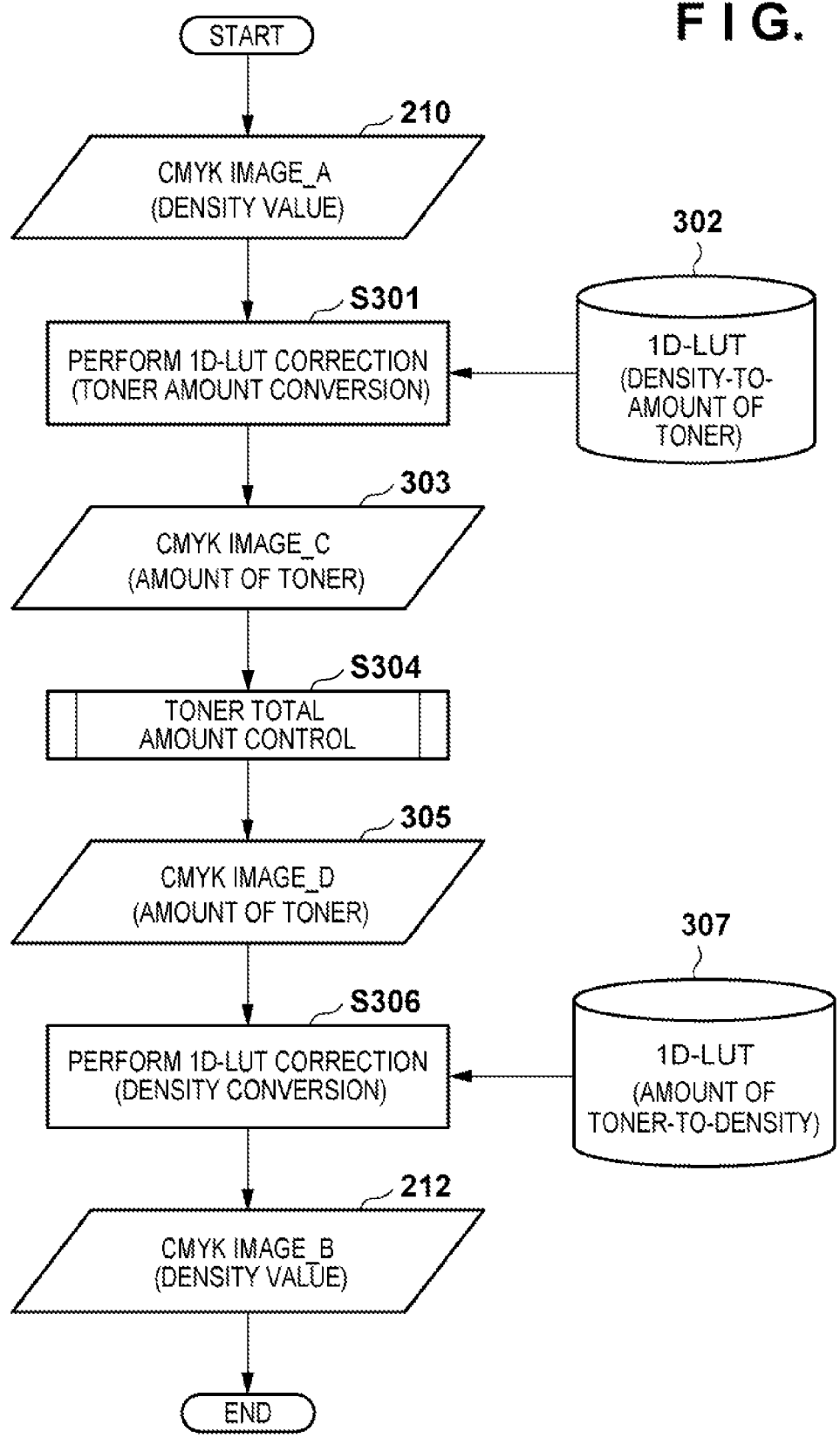
FIG. 3 is a flowchart showing the sequence of conventional toner total amount control processing.

The toner total amount control processing in step S211 of FIG. 2 will be described in detail. Before a description of the processing sequence in this embodiment, the processing sequence of a conventional method used in Japanese Patent Laid-Open No. 2007-334320 will be described with reference to FIG. 3.

Figure 4A:
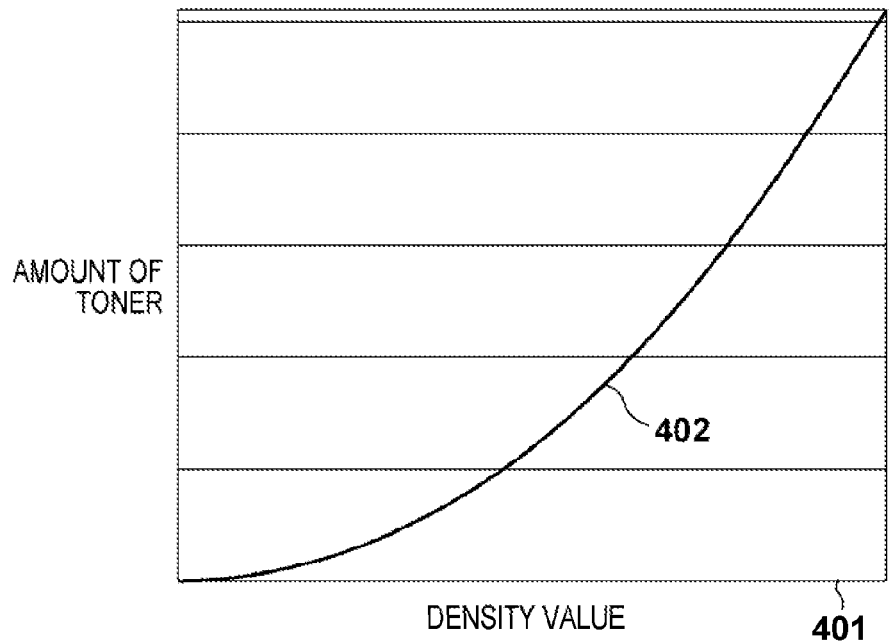
FIGS. 4A and 4B are graphs showing an example of LUTs used in the conventional toner total amount control processing.

First, in step S301, the image processing unit 114 performs 1D-LUT correction (toner amount conversion) using a 1D-LUT (density-to-amount of toner) 302 to convert the CMYK image_A (density value) 210 into a CMYK image_C (amount of toner) 303 (first conversion unit). The 1D-LUT (density-to-amount of toner) 302 will be described with reference to FIG. 4A. A graph 401 shown in FIG. 4A represents the amount of toner consumed for each pixel as a function of the density value. That is, the graph 401 visualizes the 1D-LUT (density-to-amount of toner) 302 as a graph. Although the amount of toner is normally expressed by weight (gram), it is represented by a signal value of 0% to 100% in this case, similar to the density value. Assume that a concrete amount of toner corresponding to each signal value is defined in advance and its information is held in the MFP 101. In the graph 401, data 402 indicates the relationship between the amount of toner and the density value for each of C, M, Y, and K.

Figure 5:
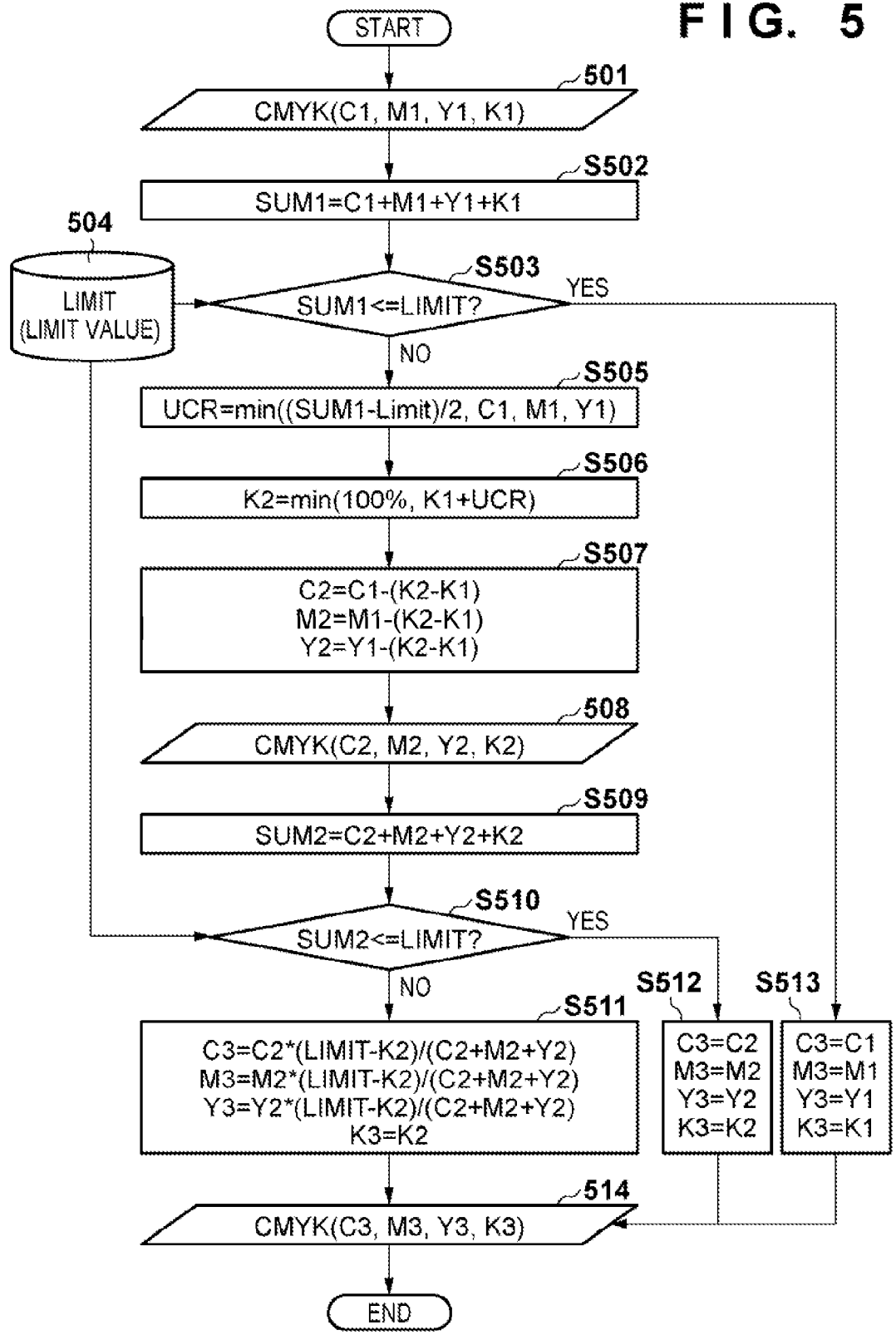
FIG. 5 is a flowchart showing the sequence of conventional toner total amount control.

In step S304, the image processing unit 114 performs toner total amount control for a CMYK image_C (toner amount) to output a CMYK image_D (amount of toner) 305. The toner total amount control processing in step S304 will be described herein with reference to FIG. 5. The processing sequence in FIG. 5 is executed for each pixel. In step S502, the image processing unit 114 calculates a sum value SUM1 for CMYK(C1,M1,Y1,K1) 501 of the pixel of interest contained in an image input as a toner total amount control target in step S304. The CMYK(C1,M1,Y1,K1) 501 is data of one pixel of the CMYK image_C (amount of toner) 303. In step S503, the image processing unit 114 reads a LIMIT (limit value) 504, and compares it with SUM1.

The LIMIT 504 indicates the limit value of the amount of toner fixable in each pixel, and is defined by a numerical value such as "300%". The LIMIT 504 is held in advance in the storage device 121 of the MFP 101, read out and acquired. When toner larger in amount than the LIMIT (limit value) 504 is to be fixed, the quality of the output image may degrade or the printer 115 may be damaged. To prevent this, the final total amount of toner needs to be set equal to or smaller than the limit value.

If SUM1 is equal to or smaller than the LIMIT 504 (YES in step S503), the image processing unit 114 outputs the CMYK (C1,M1,Y1,K1) 501 as CMYK(C3,M3,Y3,K3) 514 in step S513. The CMYK(C3,M3,Y3,K3) 514 is data of one pixel of the CMYK image_D (amount of toner) 305.

If SUM1 is larger than the LIMIT 504 (NO in step S503), the image processing unit 114 calculates a UCR value in step S505. The UCR value is calculated using the following equation:

$$UCR = \min((SUM1 - LIMIT)/2, C1, M1, Y1)$$

The UCR value is used to calculate the decrement value of each of the C, M, and Y toners and the increment value of the K toner. In the toner total amount control of step S304, to minimize the decrement value of the amount of toner, a minimum value among four values, that is, a half of the amount by which the limit value is exceeded, C1, M1, and Y1 is set as the UCR value. In step S506, the image processing unit 114 calculates a value K2 among values C2, M2, Y2, and K2 after the first toner total amount limitation. The value K2 is calculated using the following equation:

$$K2 = \min(100\%, K1 + UCR)$$

K2 is basically a value obtained by adding the UCR value to K1, but a value exceeding the maximum toner amount value of 100% cannot be set as K2 alone. Thus, if the sum of K1 and the UCR value exceeds 100%, the value K2 is set to 100%. In step S507, the image processing unit 114 decreases the values C1, M1, and Y1 to calculate the values C2, M2, and Y2. In this case, the difference between the value K1 and the value K2 calculated in step S506 is set as the decrement value.

According to the above-mentioned processing sequence, the image processing unit 114 calculates CMYK(C2,M2,Y2,K2) 508 having the decreased total amount of toner.

In step S509, the image processing unit 114 sums up C2, M2, Y2, and K2 to calculate SUM2. In step S510, the image processing unit 114 reads the LIMIT 504, and compares it with SUM2. If SUM2 is equal to or smaller than the LIMIT 504 (YES in step S510), the image processing unit 114 outputs the CMYK(C2,M2,Y2,K2) 508 as CMYK(C3,M3,Y3,K3) 514 in step S512. If SUM2 is larger than the LIMIT 504 (NO in step S510), the image processing unit 114 directly sets the value K2 as K3, and calculates a coefficient by dividing a value obtained by subtracting K2 from the LIMIT 504 by the sum value of C2, M2, and Y2 in step S511. The image processing unit 114 then multiplies C2, M2, and Y2 by the calculated coefficient to calculate toner amount-reduced C3, M3, and Y3, and outputs the CMYK(C3,M3,Y3,K3) 514.

In the above-mentioned way, the toner total amount control is executed for all pixels contained in the CMYK image_C (amount of toner) 303 as pixels of interest. After calculating the CMYK image_D (amount of toner) 305 by the toner total amount control in step S304, the image processing unit 114 calculates the CMYK image_B (density value) 212 using a 1D-LUT (amount of toner-to-density) 307 in step S306 (second conversion unit).

Figure 4B:
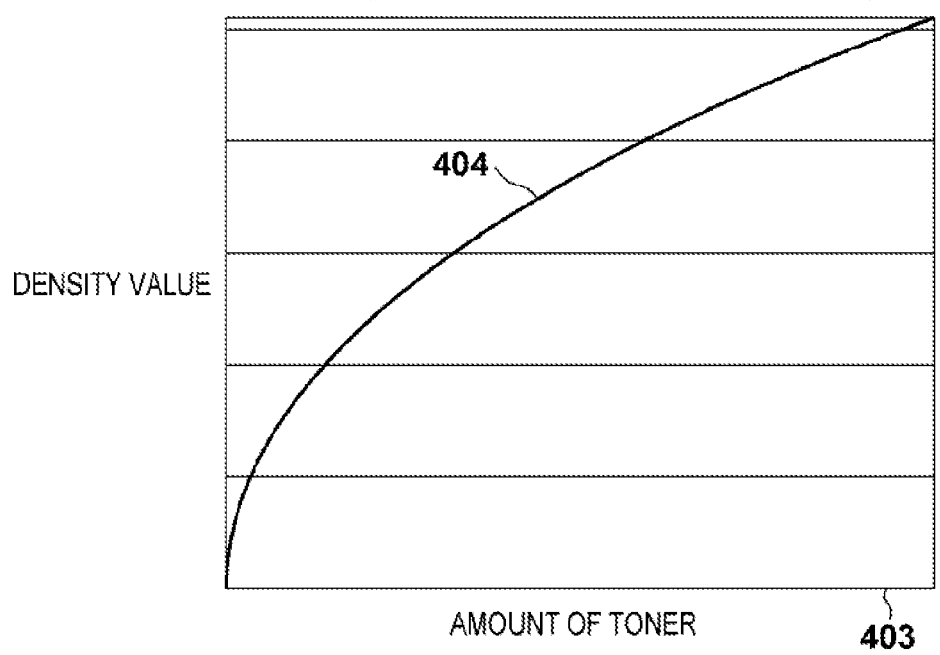

The 1D-LUT (amount of toner-to-density) 307 will be described with reference to FIG. 4B. A graph 403 shown in FIG. 4B represents the density value as a function of the amount of toner consumed for each pixel. That is, the graph 403 visualizes the 1D-LUT (amount of toner-to-density) 307 as a graph. The graph 403 is obtained by inverse calculation of the graph 401. In the graph 403, data 404 indicates the relationship between the density value and the amount of toner for each of C, M, Y, and K.

As described above, according to the conventional technique, a density value is converted into an amount of toner using the graph shown in FIG. 4A. After that, the amount of toner is converted again into a density value using the graph shown in FIG. 4B. However, a non-linear arithmetic operation is done in conversion, as shown in FIGS. 4A and 4B, so information of an input image is lost. Further, a density value is converted into an amount of toner for the entire image in the conventional processing sequence. Information is therefore lost even in a pixel which does not require toner total amount control processing. The loss of information leads to serious deterioration of the image quality such as deterioration of the gradation characteristic.

[Toner Total Amount Control Processing (First Embodiment)]

Unlike the conventional toner total amount control processing described above, the first embodiment proposes processing which prevents deterioration of the image quality and also achieves toner total amount control. A processing sequence in this embodiment will be explained with reference to FIG. 6. The following processing corresponds to the toner total amount control processing in step S211 shown in FIG. 2.

Unlike the conventional technique, in step S601, the image processing unit 114 performs the toner total amount control directly using the 1D-LUT (density-to-amount of toner) 302 serving as the first lookup table and the 1D-LUT (amount of toner-to-density) 307 serving as the second lookup table. By the toner total amount control in step S601, the CMYK image_B (density value) 212 is generated using the CMYK image_A (density value) 210 as an input.

Figure 7:
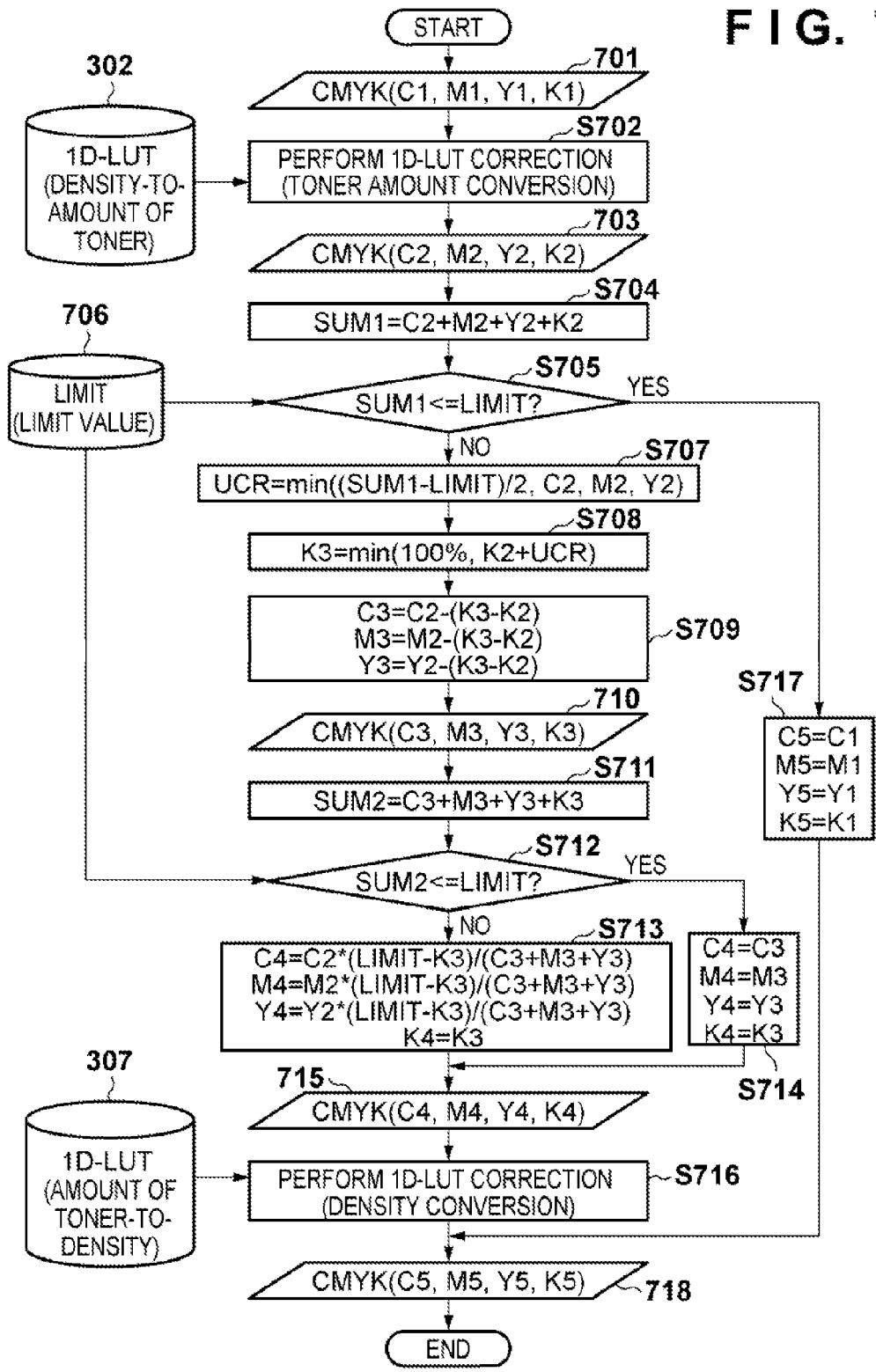
FIG. 7 is a flowchart showing the sequence of toner total amount control according to the first embodiment.

The toner total amount control in step S601 will be explained in detail with reference to FIG. 7. The processing in FIG. 7 is done for each pixel, similar to FIG. 5. In step S702, the image processing unit 114 performs 1D-LUT correction for CMYK(C1,M1,Y1,K1) 701 input as a toner total amount control target, converts a density value into an amount of toner, and outputs CMYK(C2,M2,Y2,K2) 703 (first conversion unit). At this time, the 1D-LUT (density-to-amount of toner) 302 is used. Assume that the 1D-LUT (density-to-amount of toner) 302 is defined in advance and held in, for example, the storage device 121 of the MFP 101. The CMYK(C1,M1,Y1,K1) 701 is data of one pixel of the CMYK image_A (density value) 210. In step S704, the image processing unit 114 calculates a sum value SUM1 using the CMYK(C2,M2,Y2,K2) 703. In step S705, the image processing unit 114 reads a LIMIT 706, and compares it with SUM1. The LIMIT 706 is the same as the LIMIT 504 shown in FIG. 5 in the conventional technique, and a description thereof will not be repeated.

If SUM1 is equal to or smaller than the LIMIT 706 (YES in step S705), the image processing unit 114 outputs the CMYK(C1,M1,Y1,K1) 701 as CMYK(C5,M5,Y5,K5) 718 in step S717. The CMYK(C5,M5,Y5,K5) 718 is data of one pixel of the CMYK image_B (density value) 212. As for a pixel where SUM1 has a value equal to or smaller than the LIMIT 706, data before conversion into an amount of toner is directly output, thereby preventing loss of information upon toner amount conversion.

Processes till output of CMYK(C4,M4,Y4,K4) 715 in steps S707 to S714 are the same as those till output of the CMYK(C3,M3,Y3,K3) 514 in steps S505 to S512 of FIG. 5 described as the conventional technique, and a description thereof will not be repeated. In this case, the CMYK(C2,M2,Y2,K2) 703 corresponds to the CMYK(C1,M1,Y1,K1) 501. Also, CMYK(C3,M3,Y3,K3) 710 corresponds to the CMYK(C2,M2,Y2,K2) 508. Further, the CMYK(C4,M4,Y4,K4) 715 corresponds to the CMYK(C3,M3,Y3,K3) 514.

Lastly, in step S716, the image processing unit 114 corrects the CMYK(C4,M4,Y4,K4) 715 using a 1D-LUT, converts an amount of toner into a density value, and outputs the CMYK (C5,M5,Y5,K5) 718 (second conversion unit). At this time, the 1D-LUT (amount of toner-to-density) 307 is used. Assume that the 1D-LUT (amount of toner-to-density) 307 is defined in advance and held in, for example, the storage unit (not shown) of the MFP 101.

As described above, when SUM1 is larger than the LIMIT 706, the total amount of toner is limited similar to the conventional technique, preventing a fear of deterioration of the image quality or damage to the apparatus main body which occurs when the limit value is exceeded.

Although the color material is limited to toner in this embodiment, any color material may be adopted. Also, although an LUT is used to convert a density value into an amount of toner in this embodiment, conversion may be done by an arithmetic operation defined by a specific equation. Similarly, although an LUT is used to convert an amount of toner into a density value in this embodiment, conversion may be performed by an arithmetic operation defined by a specific equation.

In this embodiment, processing is switched using the LIMIT 706 for each pixel. Alternatively, after the entire image temporarily undergoes toner total amount control, the resultant image may be compared with an image before applying toner total amount control processing to switch a pixel value to be output. At this time, information (for example, pixel position information) used in switching processing based on the LIMIT 706 may be output separately.

Although the four color materials are used in this embodiment, the present invention is not limited to this and may be applied to an apparatus which handles a larger or smaller number of color materials.

The present invention can prevent loss of information in a pixel which does not require toner total amount control processing, and can suppress deterioration of the image quality such as degradation of the gradation characteristic.

Second Embodiment

An embodiment in a situation in which the amount of toner consumed for the same density value varies in each individual color will be described. The first embodiment has explained processing of switching whether to execute toner total amount control, based on whether the total amount of toner for each pixel has exceeded a limit value. Further, an embodiment which can cope with a situation in which the amount of toner consumed for the same density value varies in each individual color will be described.

A sequence in the second embodiment will be explained. In the conventional technique, processing is done on the premise that the amount of toner consumed for the same density value is equal in all the colors: C, M, Y, and K, as shown in FIGS. 4A and 4B. However, a situation in which the output density of a specific color alone is to be made higher among a plurality of colors capable of output may be encountered in actual print processing. In this case, since the amount of toner of a specific color to be made denser increases, the amount of consumed toner varies in each individual color despite the same density value. Also, the amount of a color material used may vary in each individual color despite the same density value, depending on the components of the color material. That is, even if all the density values of a plurality of colors are 100%, the amount of output toner may vary in each individual color.

The above-mentioned situation will be described with reference to FIGS. 8A and 8B. A table 801 shown in FIG. 8A indicates the amount of toner consumed for a given density value in a specific area (for example, one pixel) for each color. Toner A is identical to one used in the conventional technique, and the amount (unit is "g") of toner for a density value of 100% is "a" for all C, M, Y, and K. That is, the amount of toner for a density value of 100% is equal in all the colors: C, M, Y, and K. The conventional technique and the first embodiment assume this relationship. In contrast to this, the amount of toner B for a density value of 100% varies in each individual color. In case of the table 801, the amount of toner for a density value of 100% is "b" for C, "c" for M, "d" for Y, and "e" for K. Assuming that the amounts of toners of the respective colors have a relation: b>c>e>d, the amount of toner consumed for a density value of 100% decreases in the order of C, M, K, and Y.

Figures 8A, 8B:
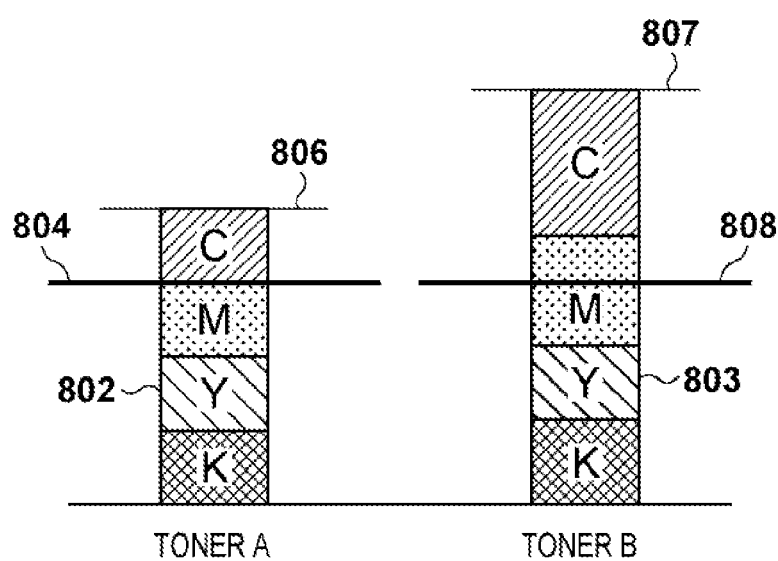
FIGS. 8A and 8B are a table and diagram showing an example in which the amounts of toners of respective colors for a density value of 100% are different from each other.

FIG. 8B conceptually shows the total amount of toner for each pixel. An amount of toner 802 is the sum of the amounts of toners consumed for a density value of 100% in toner A, and an amount of toner 803 is the sum of the amounts of toners consumed for a density value of 100% in toner B. An amount of toner 806 is the amount of toner consumed for the sum of the density values of C, M, Y, and K in toner A, that is, 400%, and an amount of toner 807 is the amount of toner consumed for the sum of the density values of C, M, Y, and K in toner B, that is, 400%. A limit value 804 is a limit value of "300%" in toner A, and corresponds to the sum value of M, Y, and K in toner A. After density values are converted into amounts of toners using a graph 401, the sum value and the limit value can be compared with each other.

A limit value 808 is a limit value of "300%" in toner B. In this case, the limit value 808 is set to "300%" with reference to the amount of K toner. That is, the limit value 808 is equivalent to a toner amount of 3e (e is an amount of toner when the K density value is 100%). However, in case of toner B, the amount of toner varies in each individual color, so the sum value of M, Y, and K may exceed the limit value 808. After density values are converted into amounts of toners using the graph 401, the sum value and the limit value cannot be compared with each other.

To solve this problem, there is proposed a method capable of toner total amount control processing even in the above-mentioned situation.

[Toner Total Amount Control Processing]

Figure 9:
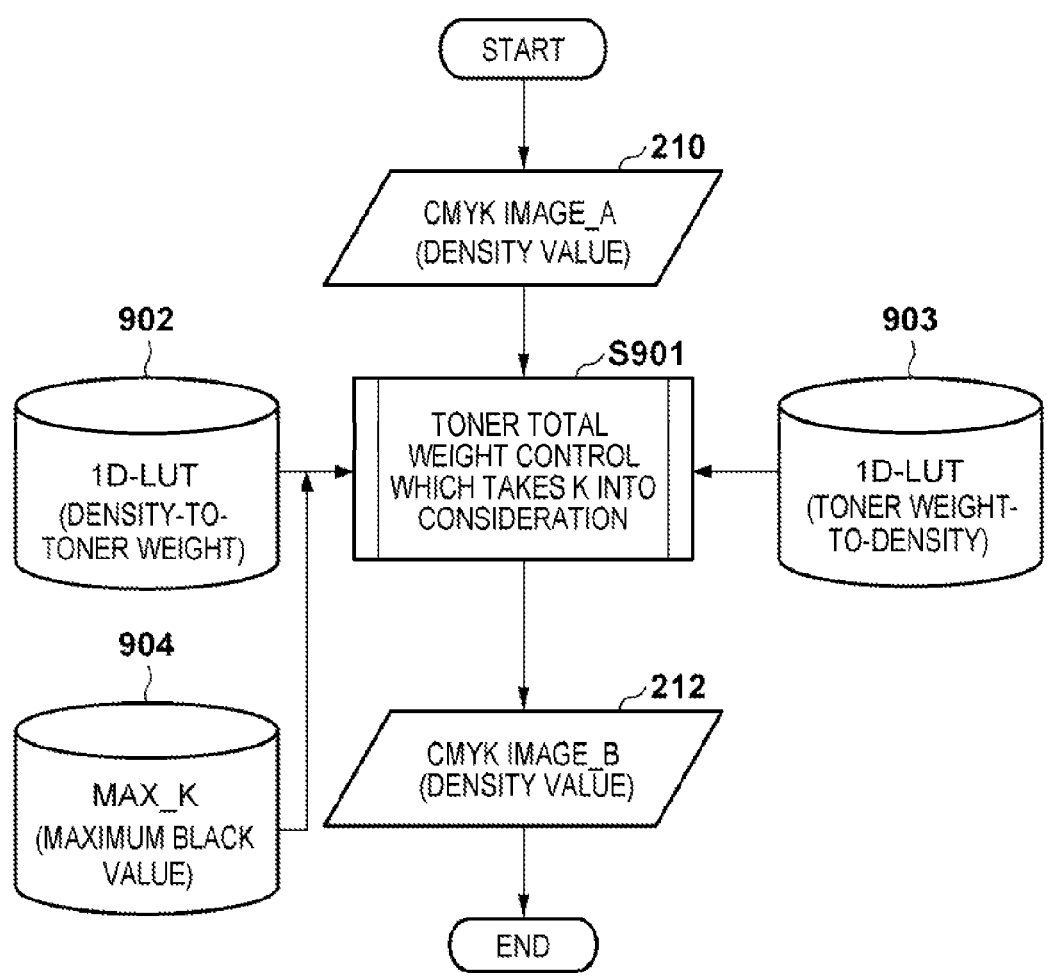
FIG. 9 is a flowchart showing the sequence of toner total amount control processing according to the second embodiment.

A processing sequence in the second embodiment will be explained with reference to FIG. 9. This processing sequence corresponds to FIG. 6 described in the first embodiment. In step S901, an image processing unit 114 performs toner total weight control by taking account of the amount of K toner, and calculates a CMYK image_B (density value) 212 from a CMYK image_A (density value) 210. At this time, the second embodiment uses a 1D-LUT (density-to-toner weight) 902, 1D-LUT (toner weight-to-density) 903, and MAX_K (maximum black value) 904.

Figure 11A:
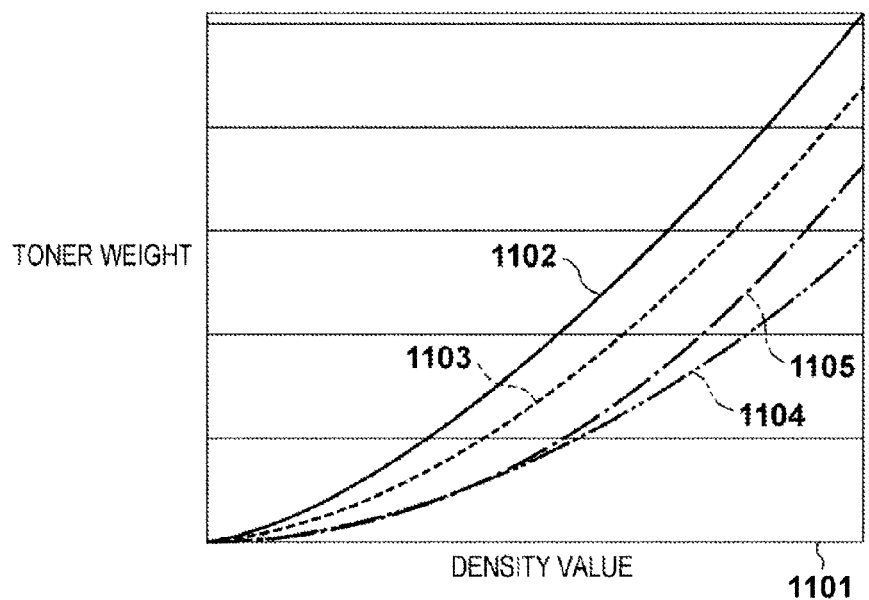
FIGS. 11A and 11B are graphs showing an example of LUTs according to the second embodiment.
Figure 11B:
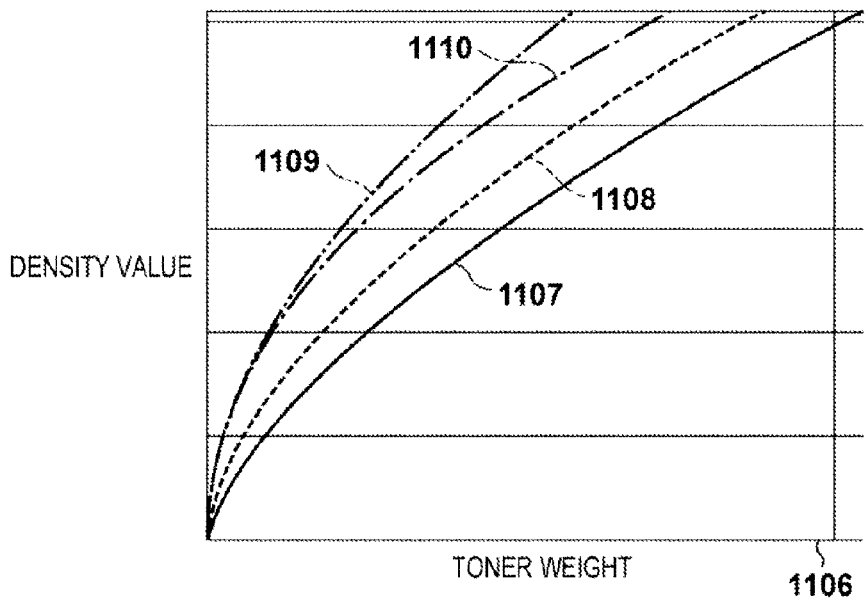

The 1D-LUT (density-to-toner weight) 902 will be explained with reference to FIGS. 11A and 11B. A graph 1101 shown in FIG. 11A represents the amount of toner consumed for each pixel as a function of the density value of each color. That is, the graph 1101 visualizes the 1D-LUT (density-to-toner weight) 902 as a graph. Although the amount of toner is normally expressed by weight (gram), it is represented by a signal value of 0% to 100% in this case, similar to the density value. In the graph 1101, data 1102 represents C, data 1103 represents M, data 1104 represents Y, and data 1105 represents K. The graph 1101 reflects the relationship of toner B based on the table 801 shown in FIG. 8A, and the amount of toner consumed for a density value of 100% varies in each individual color. The amount of toner reflecting the relationship of the amount of consumed toner which varies in each individual color for the same density value, that is, the relationship of the "weight" of toner which varies in each individual color for the same density value is defined as a "toner weight" in the second embodiment. Even the toner weight is based on percent as its unit.

The 1D-LUT (toner weight-to-density) 903 will be described. A graph 1106 shown in FIG. 11B represents the density value as a function of the amount of toner consumed for each pixel (after an arithmetic operation). The graph 1106 is obtained by inverse calculation of the graph 1101, details of which will be described later. In the graph 1106 shown in FIG. 11B, data 1107 represents C, data 1108 represents M, data 1109 represents Y, and data 1110 represents K. In the graph 1101, the toner weights of M, Y, and K for a density value of 100% are lower than 100%, so the density values of M, Y, and K in the graph 1106 become 100% before the toner weights of the corresponding colors reach 100%. As represented by the graphs 1101 and 1106, C does not have a linear relationship between the toner weight and the density value, but its toner weight is 100% for a density value of 100%.

[Calculation Processing]

Figure 10:
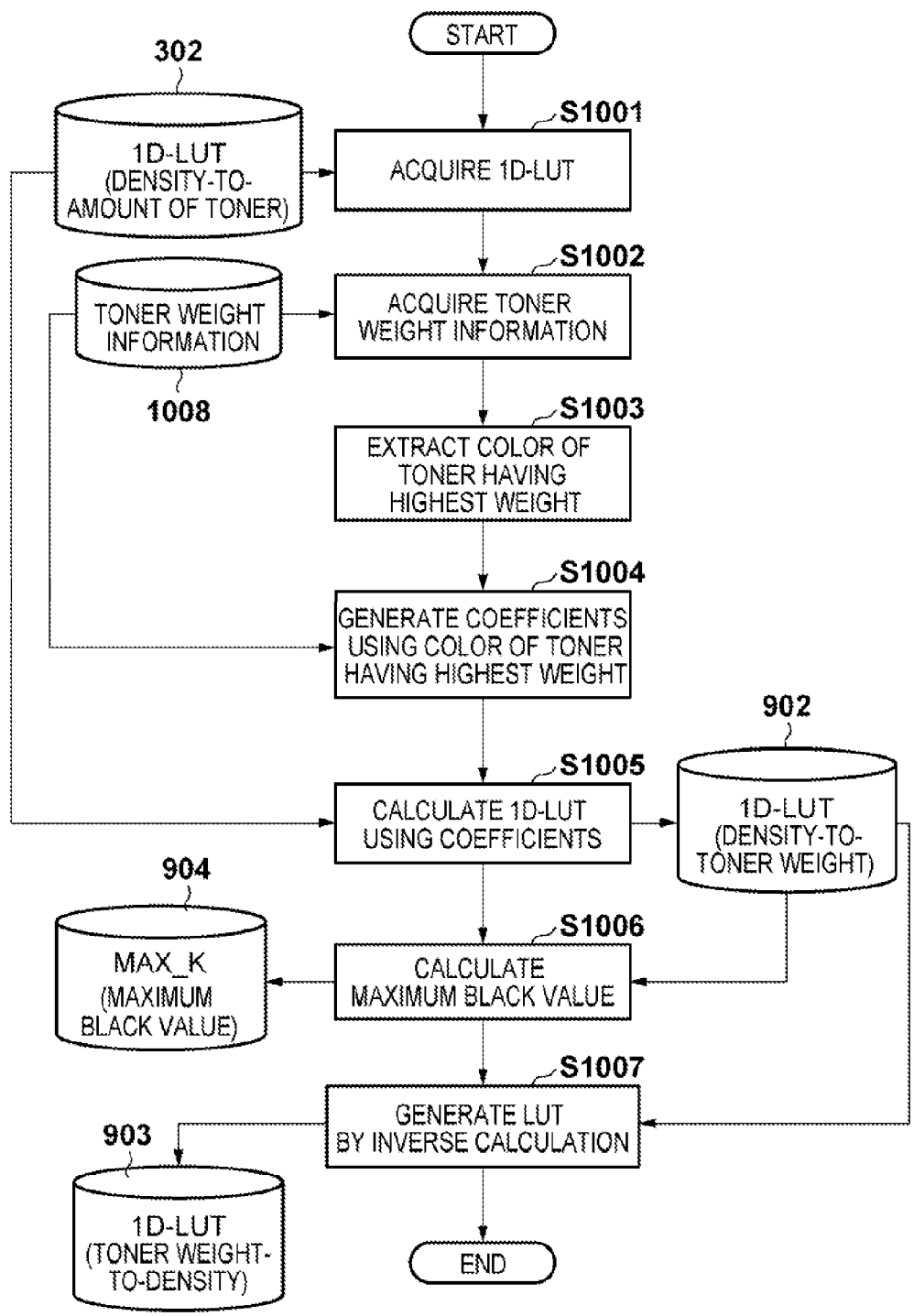
FIG. 10 is a view showing the sequence of processing to generate an LUT according to the second embodiment.

A method of calculating the 1D-LUT (density-to-toner weight) 902, the 1D-LUT (toner weight-to-density) 903, and MAX_K (maximum black value) 904 will be described next with reference to FIG. 10. The MAX_K 904 indicates information on a maximum weight by which the black color material can be output.

First, in step S1001, the image processing unit 114 acquires a 1D-LUT (density-to-amount of toner) 302. A 1D-LUT which associates the density value and the amount of toner with each other is generated for each color, and therefore has a toner amount of 100% for a density value of 100%, as in the graph 401 shown in FIG. 4A. In step S1002, the image processing unit 114 acquires toner weight information 1008. The toner weight information 1008 is information indicating, for example, the amount (unit is g) of toner consumed for a density value of 100%, and the amount (g) of toner varies in each individual color. In this case, a value defined for "toner B" in the table 801 shown in FIG. 8A is used. In the table 801 shown in FIG. 8A, assume that information on the amount of toner for the density value is defined in advance and held. In step S1003, the image processing unit 114 extracts the color of toner having a largest amount for a density value of 100% out of a plurality of toners processed in an MFP 101. Since the relation: b>c>e>d is defined between the amounts of toners in the example represented in the example shown in the table 801, b is the color of toner having a largest amount for a density value of 100%. That is, C is the color of toner having a largest amount.

In step S1004, the image processing unit 114 generates coefficients using the color of toner having a largest amount based on the toner weight information 1008. In the example shown in the table 801, the coefficient of C is "b/b=1", the coefficient of M is "c/b", the coefficient of Y is "d/b", and the coefficient of K is "e/b". More specifically, these coefficients indicate the ratios of the amounts of toners of remaining colors to the amount of toner of a color having a largest amount. Although the coefficient of the color of toner having a largest amount is set to "1", a value smaller than "1" may be defined. In step S1005, the image processing unit 114 calculates a 1D-LUT using the 1D-LUT (density-to-amount of toner) 302 and the coefficients to obtain the 1D-LUT (density-to-toner weight) 902.

In step S1006, the image processing unit 114 calculates the MAX_K 904 by focusing attention on K of the 1D-LUT (density-to-toner weight) 902. In case of the graph 1101 shown in FIG. 11A, the toner weight for a density value of 100% is determined as the MAX_K 904 by focusing attention on the data 1105 corresponding to K.

Lastly, in step S1007, the image processing unit 114 performs inverse calculation of the 1D-LUT (density-to-toner weight) 902 to calculate the 1D-LUT (toner weight-to-density) 903.

However, when the concept "toner weight" is introduced, as described above, information is lost much more than in the first embodiment. In case of the graph 1101 shown in FIG. 11A, the toner weight for a density value of 100% is about 70% in the K data 1105. Further, in case of the graph 1106 shown in FIG. 11B, the density value for a toner weight of about 70% is 100% in the K data 1110. Therefore the amount of information lost by a single conversion increases. In this situation, the image quality deteriorates more seriously in the conventional method.

[Toner Total Weight Control]

Figure 12:
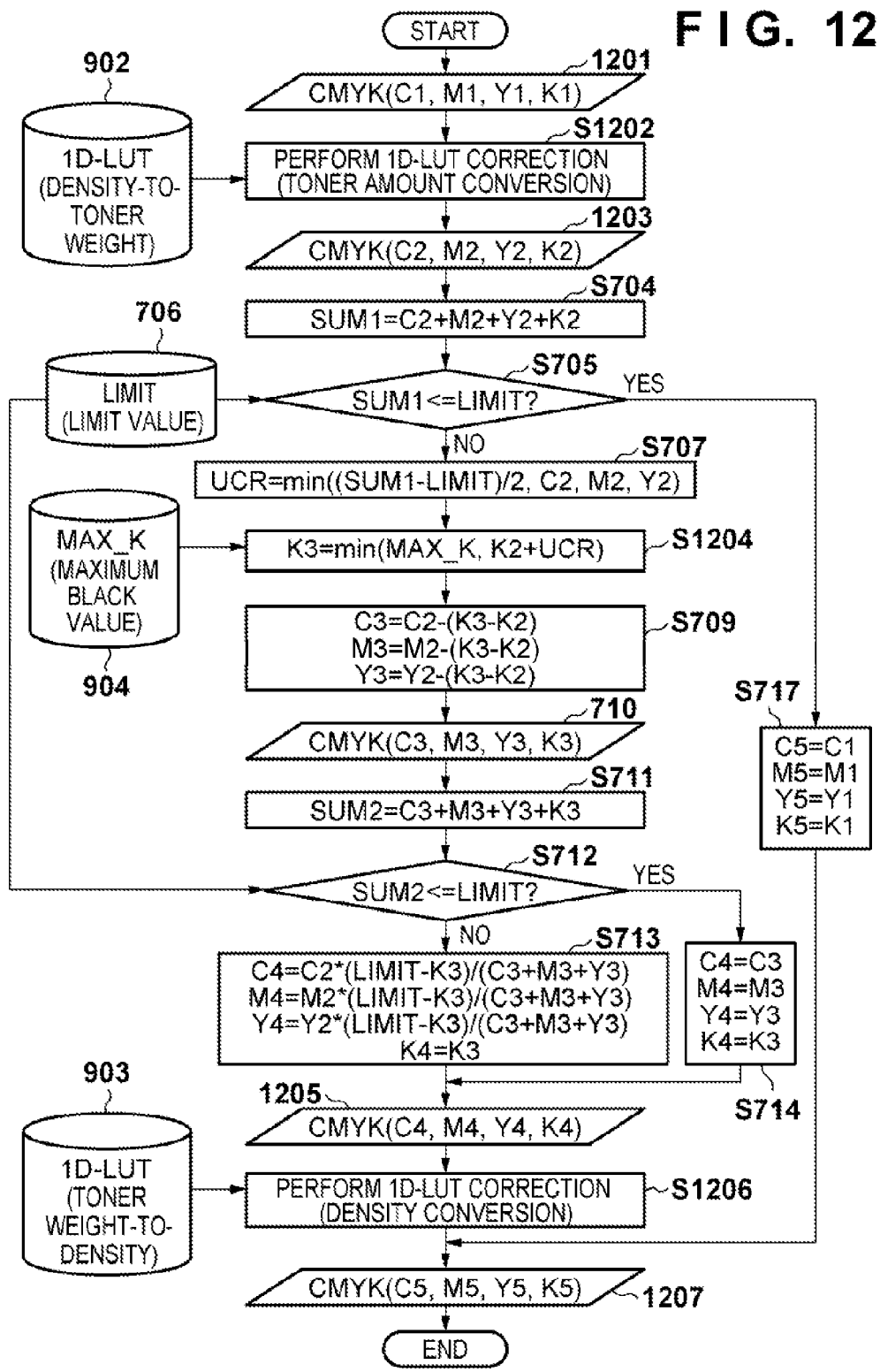
FIG. 12 is a flowchart showing the sequence of toner total amount control according to the second embodiment.

The toner total weight control which takes K into consideration in step S901 shown in FIG. 9 will be described next with reference to FIG. 12. In step S1202, the image processing unit 114 performs toner weight conversion for CMYK (C1,M1,Y1,K1) 1201 to calculate CMYK(C2,M2,Y2,K2) 1203. Unlike the above-described embodiment, the CMYK (C2,M2,Y2,K2) 1203 is not the amount of toner but "toner weight". In this case, the 1D-LUT (density-to-toner weight) 902 obtained by the calculation processing shown in FIG. 10 is used. Subsequent processes in steps S704 to S717 are the same those described with reference to FIG. 7 in the first embodiment except for steps S1204 and S1206, and a description thereof will not be repeated.

If SUM1 is equal to or smaller than the LIMIT 706 (YES in step S705), the image processing unit 114 outputs CMYK (C1,M1,Y1,K1) 701 as CMYK(C5,M5,Y5,K5) 718, similar to the first embodiment. If SUM1 is larger than the LIMIT 706 in step S705 (NO in step S705), the image processing unit 114 performs processing of limiting the amount of toner.

In step S1203, the image processing unit 114 compares the MAX_K 904 and a value obtained by adding K2 to the UCR value calculated in step S707, and calculates the smaller one of them as K3. In step S1206, the image processing unit 114 performs density conversion for CMYK(C4,M4,Y4,K4) 1205 to calculate CMYK(C5,M5,Y5,K5) 1207. At this time, the 1D-LUT (toner weight-to-density) 903 calculated in step S1007 of FIG. 10 is used. Unlike the first embodiment, the CMYK(C4,M4,Y4,K4) 1205 is not the amount of toner but the toner weight. This processing is applied to respective pixels, and toner total weight control is applied to only necessary pixels.

The reason why K3 is obtained using the MAX_K 904 in step S1204 will be described herein. When K is represented by the data 1105 in the graph 1101 shown in FIG. 11A, the weight of toner consumed for a density value of 100% is about 70%. In other words, the MAX_K 904 is about 70%. In performing 1D-LUT correction (density conversion) in step S1206, the data 1110 obtained by inverse calculation of the data 1105 is used, so the density value becomes 100% when the toner weight reaches only about 70%. In other words, the same density value of 100% is obtained regardless of whether the toner weight is 70% or 100%.

More specifically, if the process in step S708 shown in FIG. 7 is applied, a small value is taken to fall within the range of the value of K2+UCR and a value of 100%, so the value K3 becomes 100% if K2+UCR exceeds 100%. Hence, in the next step S709, C2, M2, and Y2 are decreased by an amount of "100%–K2". In contrast to this, as in step S1203, if a small value is taken to fall within the range of the value of K2+UCR and the value of the MAX_K 904, the MAX_K 904, that is, 70% is selected if K2+UCR exceeds 70%. Hence, in the next step S709, C2, M2, and Y2 are decreased by an amount of "70%–K2". In other words, the density value after correction in step S1206 is the same regardless of whether K3 is 70% or 100%, but nonetheless C2, M2, and Y2 are decreased too much by an amount of "100%–70%=30%" in step S708. For this reason, K3 needs to be obtained using the MAX_K 904.

As described above, the concept "toner weight" is introduced to enable toner total amount control processing which is difficult for the conventional method when the amount of toner consumed for the same density value varies in each individual color.

Although the color material is limited to toner in this embodiment, any color material may be adopted. Also, although the LUT is used to convert a density value into a toner weight in this embodiment, conversion may be performed by an arithmetic operation defined by a specific equation. Similarly, although an LUT is used to convert a toner weight into a density value in this embodiment, conversion may be performed by an arithmetic operation defined by a specific equation.

In this embodiment, whether to apply toner total amount control processing is switched using the LIMIT 706 for each pixel. Alternatively, after the entire image temporarily undergoes toner total amount control, the resultant image may be compared with an image before applying the toner total amount control processing to switch a pixel value to be output. At this time, information (for example, pixel position information) used in switching based on the LIMIT 706 may be output separately.

The table 801 shown in FIG. 8A has been exemplified as the toner weight information 1008 in this embodiment, but the present invention is not limited to this. Again, although the difference in the amount of a color material consumed for the same density value among the individual colors is defined by the concept "toner weight" in this embodiment, any criterion such as "volume" may be employed as long as the concept can represent this difference between the individual colors.

Although the four color materials are used in this embodiment, the present invention is not limited to this and may be applied to an apparatus which handles a larger or smaller number of color materials.

The second embodiment can prevent loss of information in a pixel not to undergo toner total amount control processing, and can suppress deterioration of the image quality such as degradation of the gradation characteristic. Even if the amount of a color material such as toner consumed for the same density value varies in each individual color, the amount of a color material can precisely be limited while preventing loss of information.

Third Embodiment

An embodiment when a determination image is generated after toner total amount control processing, and smoothing processing is performed using the generated determination image will be described as the third embodiment. In the above-described embodiments, whether to perform toner total amount control processing for each pixel is switched based on whether the total amount of toner has exceeded the limit value. In the third embodiment, smoothing processing is executed using a generated determination image for image data having undergone toner total amount control processing. Accordingly, the third embodiment can correct a pixel value difference at the boundary between a pixel having undergone toner total amount control processing and a pixel having undergone no toner total amount control processing, further improving the image quality of the entire image.

In the above-described embodiment, whether to perform toner total amount control for each pixel in an image is switched using the LIMIT 706. Thus, the image quality may change at the boundary between a pixel to undergo toner total amount control and a pixel not to undergo it. The third embodiment will explain processing for preventing such an image quality difference.

[Toner Total Amount Control Processing]

Figure 13:
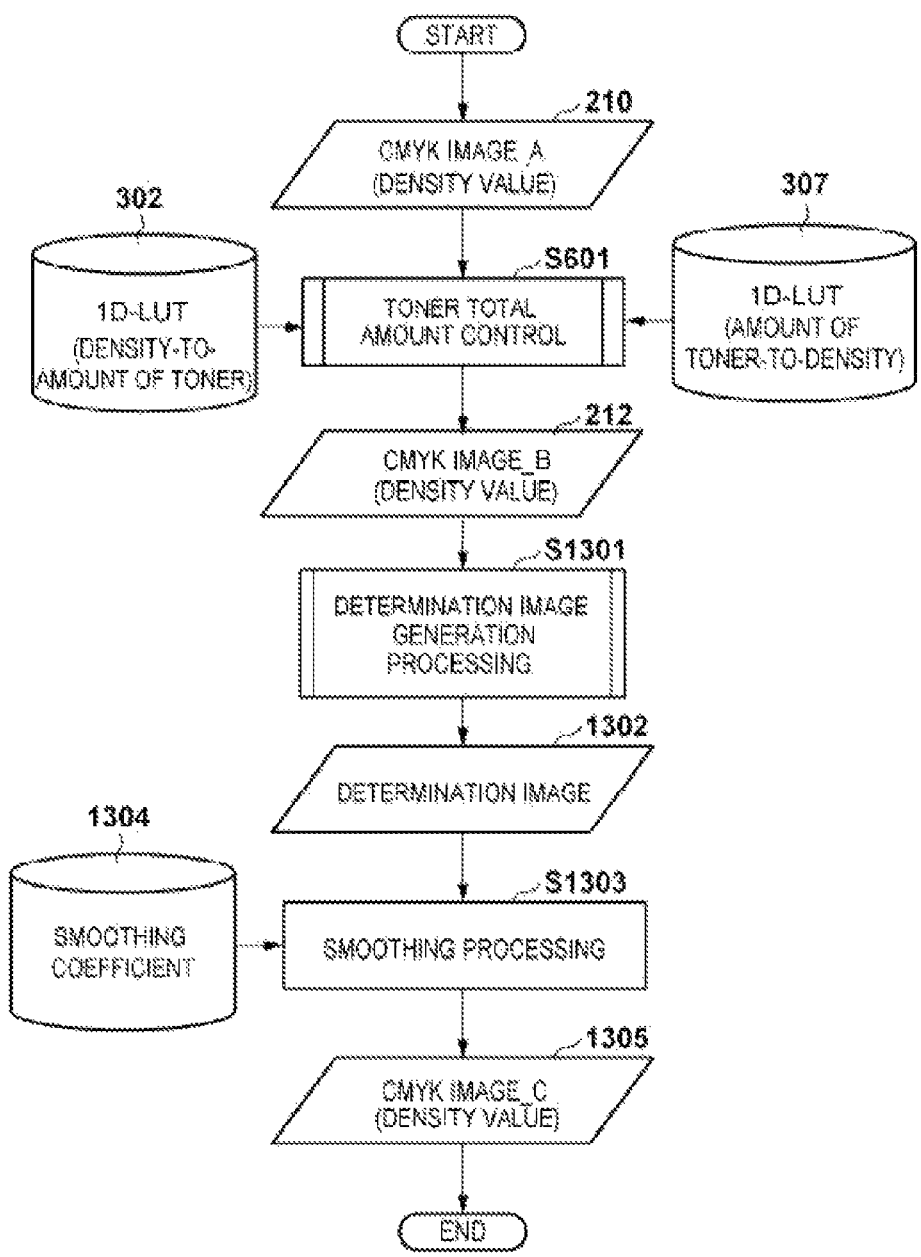
FIG. 13 is a flowchart showing the sequence of toner total amount control processing according to the third embodiment.

FIG. 13 is a flowchart showing a processing sequence in this embodiment. This processing sequence corresponds to one shown in FIG. 6 described in the first embodiment. After the same toner total amount control as that in the first embodiment is performed in step S601, an image processing unit 114 performs determination image generation processing to output a determination image 1302 in step S1301.

[Determination Image Generation Processing]

Figure 14:
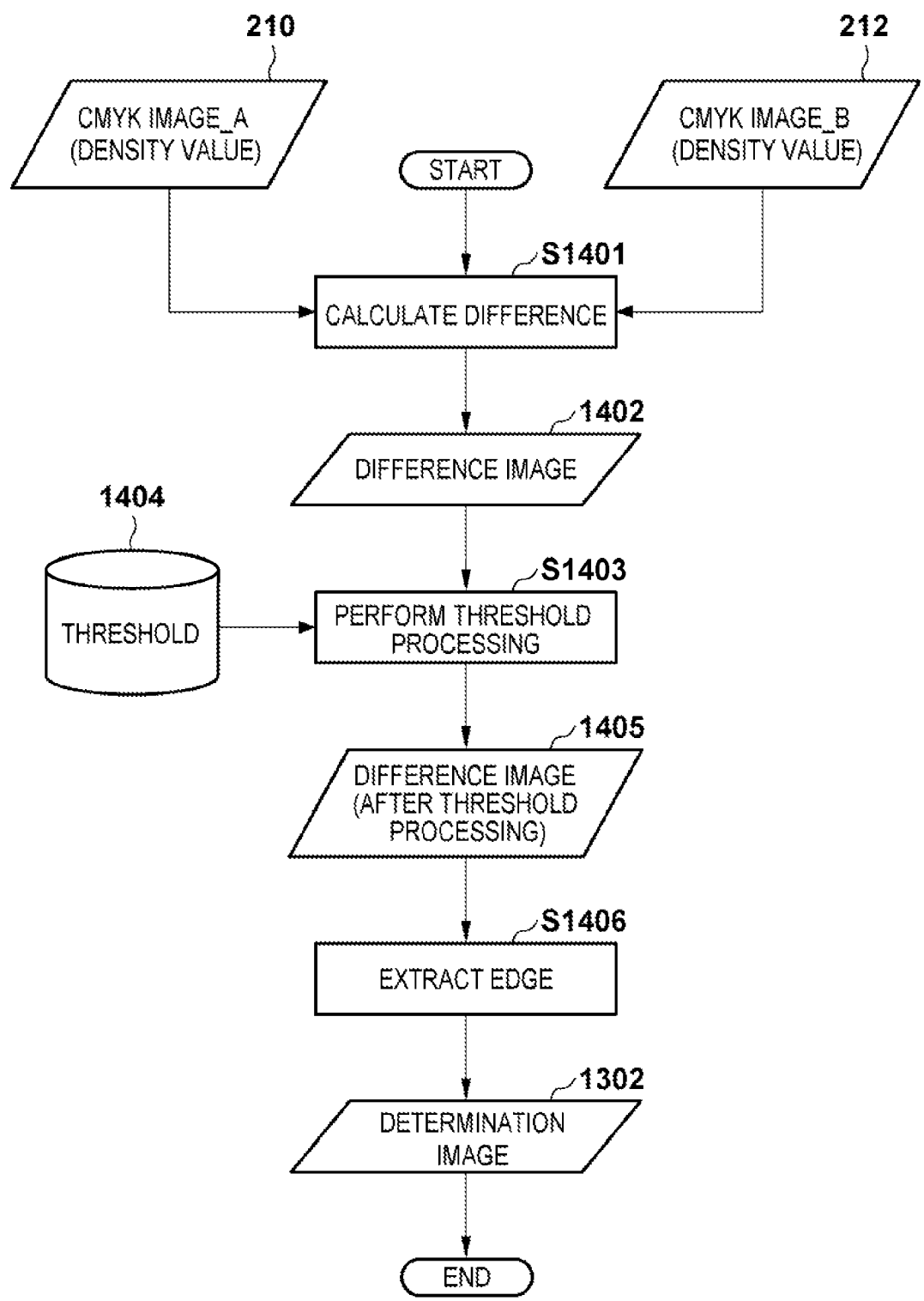
FIG. 14 is a flowchart showing the sequence of determination image generation processing according to the third embodiment.

The determination image generation processing in step S1301 shown in FIG. 13 will be explained with reference to FIG. 14. First, in step S1401, the image processing unit 114 reads a CMYK image_A (density value) 210 and CMYK image_B (density value) 212 to generate a difference image 1402. The difference image 1402 is information indicating the value difference between corresponding pixels among pixels contained in the CMYK image_A (density value) 210 and CMYK image_B (density value) 212. More specifically, a pixel having undergone no toner total amount control processing has a difference "0 (no difference)", and a pixel having undergone it exhibits a difference in pixel value. In step S1403, the image processing unit 114 reads a threshold 1404 and performs threshold processing to calculate a difference image (after threshold processing) 1405.

It is considered that a pixel having a large difference before and after toner total amount control processing has a large difference from a pixel to which no toner total amount control processing is applied. In this threshold processing, therefore, pixel data having a large difference before and after toner total amount control processing is extracted. This pixel data is compared with a threshold for each of C, M, Y, and K to generate the difference image (after threshold processing) 1405. It is also possible to perform threshold processing for the sum value of C, M, Y, and K in each pixel and generate the difference image (after threshold processing) 1405 common to these colors. In this case, processes common to these colors are executed in steps to be described below. Assume that the threshold 1404 used here is defined in advance and held in a storage device 121 of an MFP 101.

In step S1406, the image processing unit 114 extracts an edge from the difference image (after threshold processing) 1405 to generate the determination image 1302. This edge extraction is processing of extracting the boundary between pixels extracted because they have large differences, and the remaining pixels. For example, an edge is extracted using the coordinates of each pixel.

Referring back to FIG. 13, lastly, in step S1303, the image processing unit 114 reads a smoothing coefficient 1304, performs smoothing processing for the determination image 1302, outputs a CMYK image_C (density value) 1305. This smoothing processing can employ a well-known method and is not particularly limited. Also, assume that the smoothing coefficient 1304 is defined in advance and held in, for example, the storage device 121 of the MFP 101.

The above processing can reduce the value difference between a pixel to which toner total amount control processing is applied and a pixel to which it is not applied, further preventing deterioration of the image quality.

Although the color material is limited to toner in this embodiment, any color material may be adopted. Also, this embodiment is premised on that the amount of toner consumed for the same density value is equal in each individual color. However, the third embodiment is applicable to even a situation in which the amount of toner consumed for the same density value varies in each individual color, like the second embodiment.

In determination image generation processing, a multi-level determination image may be output to switch the smoothing coefficient in accordance with the output value. In this case, the degree of smoothing is increased for a pixel having a large difference before and after toner total amount control processing, and decreased for a pixel having a small difference. This can further reduce a pixel value difference at the boundary between a pixel to which toner total amount control processing is applied and a pixel to which it is not applied.

The third embodiment can prevent loss of information in a pixel to which no toner total amount control processing is applied, and can suppress deterioration of the image quality such as degradation of the gradation characteristic. Further, image data after toner total amount control processing undergoes smoothing processing using a determination image. The third embodiment can decrease a pixel value difference at the boundary between a pixel to which toner total amount control processing is applied and a pixel to which it is not applied, further preventing deterioration of the image quality.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-273942, filed Dec. 8, 2010, and No. 2011-247969, filed Nov. 11, 2011, which are hereby incorporated by reference herein in their entirety.

What is claimed is:

1. An image processing apparatus, comprising:
   a first correction unit configured to perform correction using first correction characteristics to a first pixel value of image data;
   a comparison unit configured to compare a limit value with a value calculated from a second pixel value which has been obtained by the correction by the first correction unit;
   a control unit configured, if the calculated value is greater than the limit value as a result of the comparison by the comparison unit, to control the second pixel value so that the calculated value becomes equal to or less than the limit value;
   a second correction unit configured to perform correction using second correction characteristics to a third pixel value which has been obtained by the controlling by the control unit; and
   an output unit configured to output a pixel value which has been obtained by the correction by the second correction unit,
   wherein if the calculated value is equal to or less than the limit value as a result of the comparison by the comparison unit, the control unit outputs the first pixel value by the output unit, and
   wherein the second correction characteristics are inverse characteristics of the first correction characteristics.

2. The apparatus according to claim 1, wherein the control unit controls the second pixel value by using a maximum value by which a black color material corresponding to a black component of pixels constructing the image data can be output.

3. The apparatus according to claim 2, wherein, based on information indicating that the amount consumed for an identical signal value varies in each individual color material, the maximum value by which the black color material can be output is calculated from a ratio of an amount of the consumed black color material to a largest amount of a consumed color material among a plurality of color materials for a maximum signal value which can be output for each color.

4. The apparatus according to claim 1, wherein the control unit further performs smoothing processing after controlling the second pixel value.

5. The apparatus according to claim 4, wherein the control unit further generates, by using image data before and after the controlling, a determination image representing a pixel to which the smoothing processing is applied, and performs the smoothing processing in accordance with the determination image.

6. The apparatus according to claim 1, wherein the first correction characteristics and the second correction characteristics are defined for each color component of pixels constructing the image data.

7. The apparatus according to claim 1, wherein the first correction characteristics and the second correction characteristics are correction characteristics for which the relationship between an output value to an input value is non-linear.

8. The apparatus according to claim 1, wherein the first correction characteristics and the second correction characteristics are such that that amounts of color material used for maximum densities of respective color components differ from each other.

9. The apparatus according to claim 1, wherein in the first correction characteristics, an output value for a maximum value of input is defined for each color component of pixels constructing the image data.

10. The apparatus according to claim 1, wherein the first correction characteristics and the second correction characteristics are provided in a lookup table.

11. An image processing method in an image processing apparatus, comprising:
    a first correction step of performing correction using first correction characteristics to a first pixel value of image data;
    a comparison step of comparing a limit value with a value calculated from a second pixel value which has been obtained by the correction in the first correction step;
    a control step of, if the calculated value is greater than the limit value as a result of the comparison in the comparison step, controlling the second pixel value so that the calculated value becomes equal to or less than the limit value;
    a second correction step of performing correction using second correction characteristics to a third pixel value which has been obtained by the controlling in the control step; and
    an output step of outputting a pixel value which has been obtained by the correction in the second correction step,
    wherein if the calculated value is equal to or less than the limit value as a result of the comparison in the comparison step, the first pixel value is output in the output step, and
    wherein the second correction characteristics are inverse characteristics of the first correction characteristics.

12. A non-transitory, computer-readable medium storing a program for causing a computer to function as:
    a first correction unit configured to perform correction using first correction characteristics to a first pixel value of image data;
    a comparison unit configured to compare a limit value with a value calculated from a second pixel value which has been obtained by the correction by the first correction unit;
    a control unit configured, if the calculated value is greater than the limit value as a result of the comparison by the comparison unit, to control the second pixel value so that the calculated value becomes equal to or less than the limit value;
    a second correction unit configured to perform correction using second correction characteristics to a third pixel value which has been obtained by the controlling by the control unit; and an output unit configured to output a pixel value which has been obtained by the correction by the second correction unit, wherein if the calculated value is equal to or less than the limit value as a result of the comparison by the comparison unit, the control unit outputs the first pixel value by the output unit, and wherein the second correction characteristics are inverse characteristics of the first correction characteristics.

* * * * *